No. 807,039. PATENTED DEC. 12, 1905.
J. H. MARTIN.
COMBINED CANE AND STOOL.
APPLICATION FILED MAR. 7, 1905.
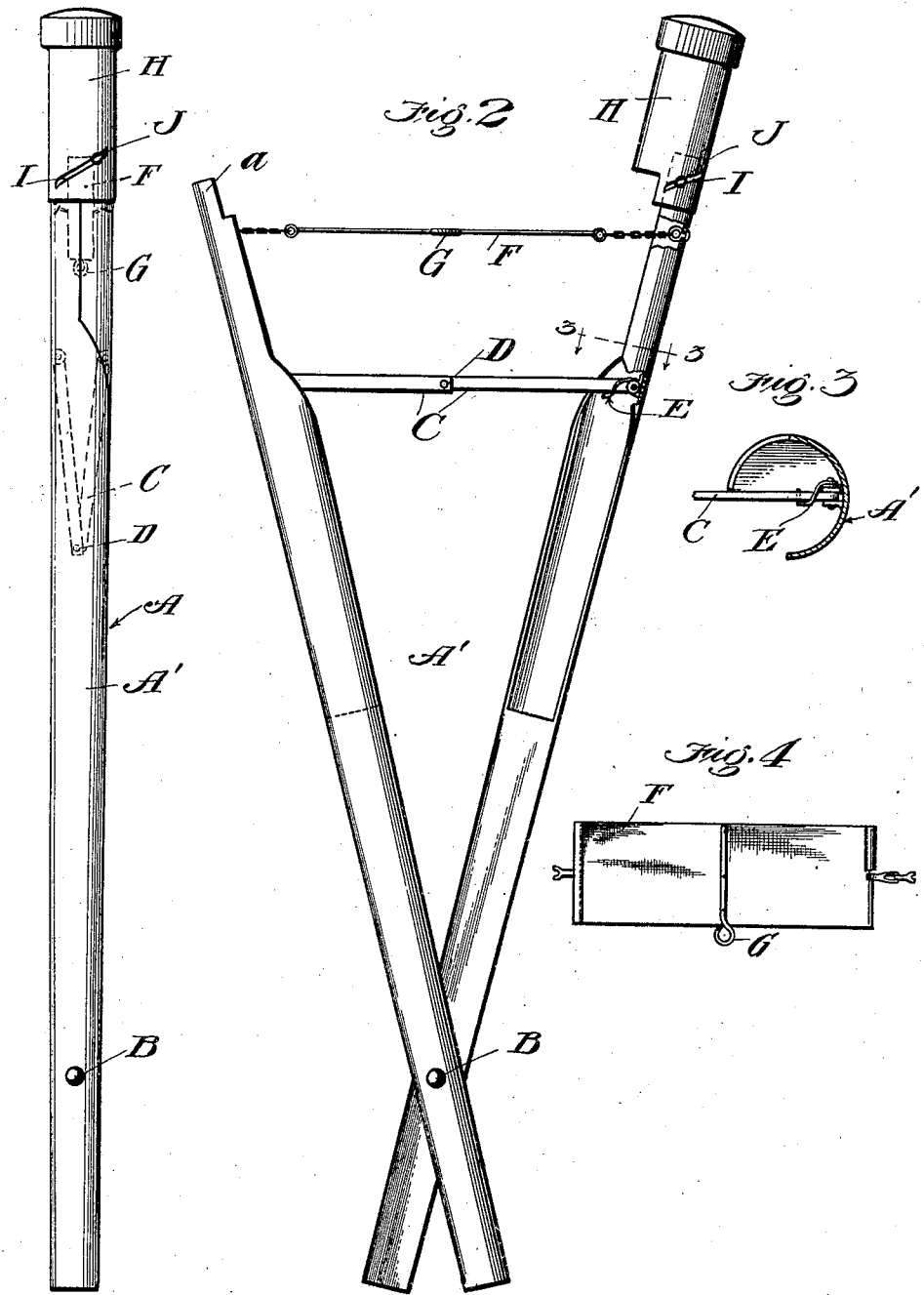

UNITED STATES PATENT OFFICE.

JOSEPH H. MARTIN, OF RIVERSIDE, CALIFORNIA.

COMBINED CANE AND STOOL.

No. 807,039.                    Specification of Letters Patent.                    Patented Dec. 12, 1905.

Application filed March 7, 1905. Serial No. 248,926.

*To all whom it may concern:*

Be it known that I, JOSEPH H. MARTIN, a citizen of the United States, residing at Riverside, in the county of Riverside and State of California, have invented new and useful Improvements in a Combined Cane and Stool, of which the following is a specification.

The object of my invention is to provide a handy walking-stick that can be readily converted into a stool. I accomplish this object by means of the device described herein and shown in the accompanying drawings, in which—

Figure 1 is a side elevation of my combined cane and stool in its folded position as a cane. Fig. 2 is a side elevation of my combined cane and stool in its open position as a stool. Fig. 3 is a transverse section taken on lines 3 3 of Fig. 2. Fig. 4 is a plan of the seat of the stool detached from the cane.

In the drawings, A is a representation of my improved combined cane and stool made up of two members A', pivoted together at B and having mounted in the upper portion thereof a folding brace C. This brace is composed of two members pivoted together in the center, as at D, the outer ends of the brace being pivoted in one member of the cane and the other in the other member, as shown in Figs. 1 and 2.

When the members of the cane are in their open position, as shown in Fig. 2, the brace C will be in its extended position, as shown therein. The tension placed thereon by the spring E will have a tendency to keep the brace up and in its extended position and prevent the same from falling down and folding up, except when power is placed thereupon to push it down into its folded position, as shown in dotted lines in Fig. 1. Therefore upon the spreading apart of the upper ends of the members the brace will throw itself into its extended position and will remain there by virtue of the tension placed thereon by the spring E. The seat F will be thrown into its open position, as shown in Fig. 2, when the members of the cane are spread apart and will be held in this position by the tension of the spring thereon. This seat is preferably made of canvas and has riveted in the center thereof a rod G, by the rotation of which the seat can be wound into a small compass and placed into the hollow upper end of the two members of the cane when in its folded position. This position of the seat when rolled up is shown in dotted lines in Fig. 1. When the cane is in its folded position, the cap H, which is cylindrical, fits over the outside of the folded members and when rotated to the right is crowded down and over and firmly holds the upper ends of the two members of the cane together. It has an annular groove I therein, into which projects a lug J on the upper end of one of the members of the cane. Upon turning the cap H to the right the lug J in the groove I will cause the cap to move down into the position shown in Fig. 1 and hold the two members firmly locked together at their upper ends. When the device is in this position, it assumes the shape of an ordinary cane with an ordinary cap thereon. By rotating the cap to the left the cap will move upward and uncover the upper end *a* on one of the members of the cane and permit the cane to be thrown into its expanded position.

Having described my invention, what I claim as new, and desire to secure by Letters Patent, is—

1. A combined cane and stool comprising two tubular members pivoted together at their lower ends and provided with a folding brace connecting the two; a spring to normally hold the brace in its expanded position; a seat attached at each end to the upper ends of the members and having on its center a bar adapted to roll the seat into a roll and for placement in the upper tubular end of the cane when folded together.

2. The herein-described cane and stool comprising two members pivotally mounted as at B and having in the upper ends thereof a spreading brace D; a spring E adapted to hold the brace in its extended position; a seat F composed of cloth or other suitable fabric and having in the center thereof a bar G adapted when turned to wind the seat into a roll; a cap H for the top thereof adapted when turned to the left to permit the members to be spread apart when turned to the right to pass over the ends of both members and hold them securely together.

In witness that I claim the foregoing I have hereunto subscribed my name this 14th day of February, 1905.

JOSEPH H. MARTIN.

Witnesses:
 A. AIRD ADAIR,
 W. A. PURINGTON.